(12) United States Patent
Kim et al.

(10) Patent No.: US 7,026,790 B2
(45) Date of Patent: Apr. 11, 2006

(54) BUILT-IN BATTERY CONTROLLER FOR PERSONAL TELECOMMUNICATION DEVICE

(75) Inventors: Han-sung Kim, Seongnam-si (KR); Suk-man Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 96 days.

(21) Appl. No.: 10/733,811

(22) Filed: Dec. 12, 2003

(65) Prior Publication Data
US 2004/0169494 A1 Sep. 2, 2004

(30) Foreign Application Priority Data
Dec. 13, 2002 (KR) ....................... 10-2002-0079753

(51) Int. Cl.
*H02J 7/00* (2006.01)
(52) U.S. Cl. ...................... 320/112; 361/93.1
(58) Field of Classification Search .............. 320/124, 320/137, 160, 112; 361/93.1, 100, 101, 87
See application file for complete search history.

(56) References Cited

U.S. PATENT DOCUMENTS

| 4,042,836 A | * | 8/1977 | Compton et al. | ............ 327/376 |
| 5,734,252 A | * | 3/1998 | Griffin et al. | ................ 320/124 |
| 6,073,033 A | * | 6/2000 | Campo | ........................ 455/566 |

FOREIGN PATENT DOCUMENTS

| KR | 20-1998-10145 U | 1/2000 |
| KR | 20-0224826 Y1 | 3/2001 |

* cited by examiner

*Primary Examiner*—Karl D. Easthom
*Assistant Examiner*—Samuel Berhanu
(74) *Attorney, Agent, or Firm*—Sughrue Mion, PLLC

(57) ABSTRACT

A built-in battery controller for a personal telecommunication device. The battery controller includes a push switch that is switched on and off by a user, a power control unit that is connected to the push switch and allows a leakage current to flow through the power switch, a battery pack including a protection circuit module (PCM) for turning off the battery when the leakage current flows through the power switch under the control of the power control unit, and a charging circuit for charging the battery pack. The battery controller can be simply operated and can more reliably turn off the battery without affecting the outer appearance of the device.

10 Claims, 2 Drawing Sheets

BUILT-IN BATTERY CONTROLLER FOR PERSONAL TELECOMMUNICATION DEVICE

This application claims the priority of Korean Patent Application No. 2002-79753, filed on Dec. 13, 2002, in the Korean Intellectual Property Office, the disclosure of which is incorporated herein in its entirety by reference.

BACKGROUND OF THE INVENTION

1. Field of the Invention

The present invention relates to a battery controller, and more particularly, to a built-in battery controller for a personal telecommunication device.

2. Description of the Related Art

When a personal telecommunication device including a built-in battery, such as a cellular phone or personal digital assistant (PDA) is delivered from a factory to a customer, the built-in battery must be kept in a complete off state. However, it is often complex to turn on the built-in battery from the complete off state. Since the battery has been built in the personal telecommunication device and turned off at the factory, the customer is required to disassemble the personal telecommunication device, turn on the battery, and reassemble the device. To solve this problem, the battery can be equipped with a switch that can be operated from the outside. However, since the size of such outside switch is relatively large, the battery is not conducive to use in a modern telecommunication device requiring a slim design.

FIG. 1 is a schematic diagram of a related art battery controller. As shown in FIG. 1, the controller 100 includes a battery 110 and a slide switch 120 for switching on/off the battery 100. The slide switch 120 is directly connected to the battery 100. In this type of controller, since the slide switch 120 directly controls the battery 110, a relatively strong and large mechanical switch is used as the slide switch 120. Further, such a relatively large mechanical switch capable of enduring high currents is placed outside of a set, e.g., a telecommunication device. The slide switch 120 is switched off at the factory and is switched on when a customer obtains and operates the set. Since a relatively large slide switch is placed outside of a set, the controller 100 shown in FIG. 1 is not adequate for use in a modern personal telecommunication device, such as a PDA, having a slim size.

FIG. 2 is a schematic diagram of another type of related art battery controller. The battery controller 200 shown in FIG. 2 includes a battery 210, a Field Effect Transistor (FET) 220 for controlling on/off operations of the battery 210, and a slide switch 230 for controlling the FET 220. The FET 220 is fairly small in comparison with a mechanical switch and is placed within a set. Further, since the function of the slide switch 230 is to control the FET 220, a fairly small slide switch can be used and placed outside of a set in comparison with a mechanical switch used in the controller 100 shown in FIG. 1. When the slide switch 230 is switched off at the factory, the FET 220 is turned off and thus the battery 210 is turned off. When a customer switches on the slide switch 230, the FET 220 connected to the slide switch 230 is turned on, and thus, the battery 210 is turned on. The controller 200 shown in FIG. 2 is advantageous from the viewpoint of design since a fairly small slide switch can be used. However, since power is continuously applied to the FET switch 220, the FET switch 220 can be damaged, and if the FET 220 is damaged, the battery 210 may not be kept in the off state. In this event, an accidental problem may occur during shipment.

Since the switch to turn off and on the battery is used only once until a customer purchases the set including the battery, it is important to design the outer appearance of the set such that the switch is not too noticeable. Further, since the purpose of turning off the battery is to prevent an accident during distribution, it is important to surely turn off the battery.

SUMMARY OF THE INVENTION

The present invention provides a built-in battery controller for a personal telecommunication device, which can be simply operated and can reliably turn off the battery without affecting the outer appearance of the device.

According to a non-limiting aspect of the present invention, there is provided a built-in battery controller for a personal telecommunication device, which includes a push switch that is switched on and off by a user, a power control unit that is connected to the push switch and allows a leakage current to flow through the power switch, a battery pack including a protection circuit module (PCM) for turning off the battery when the leakage current flows through the power switch under the control of the power control unit, and a charging circuit for charging the battery pack.

When a DC adapter is connected to the charging circuit and charging currents are applied to the battery pack in an off state of the battery, the PCM detects the charging currents, and accordingly, the battery is turned on.

The battery pack may include a rechargeable battery comprising at least one of Lithium-ion, Lithium-ion polymer, and NiMH batteries.

An opening or hole may be provided in an outer surface of the personal telecommunication device, through which a user can push the push switch connected with the power control unit.

In addition, when the PCM of the battery pack detects the leakage current, an FET within the battery pack is turned off, and accordingly, the battery is turned off.

BRIEF DESCRIPTION OF THE DRAWINGS

The above and other aspects and advantages of the present invention will become more apparent by describing, in detail, exemplary embodiments thereof with reference to the attached drawings in which.

DETAILED DESCRIPTION OF THE INVENTION

An exemplary embodiment of the present invention will now be described with reference to FIGS. 3 and 4.

Figure 1:
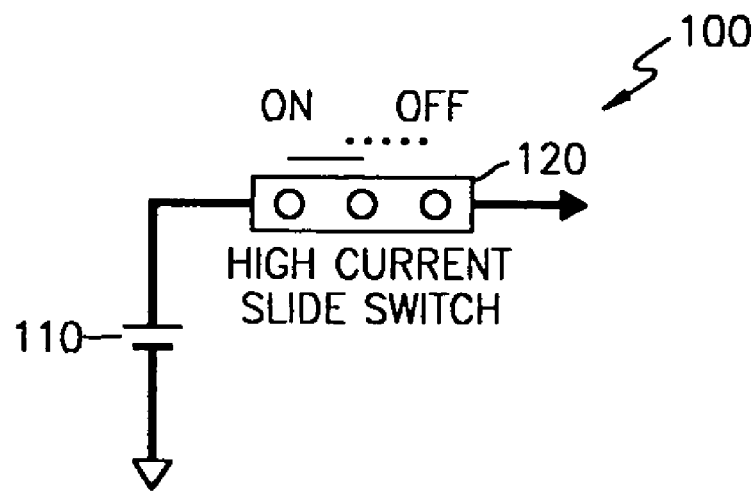
FIG. 1 is a schematic diagram of a related art battery controller.
Figure 2:
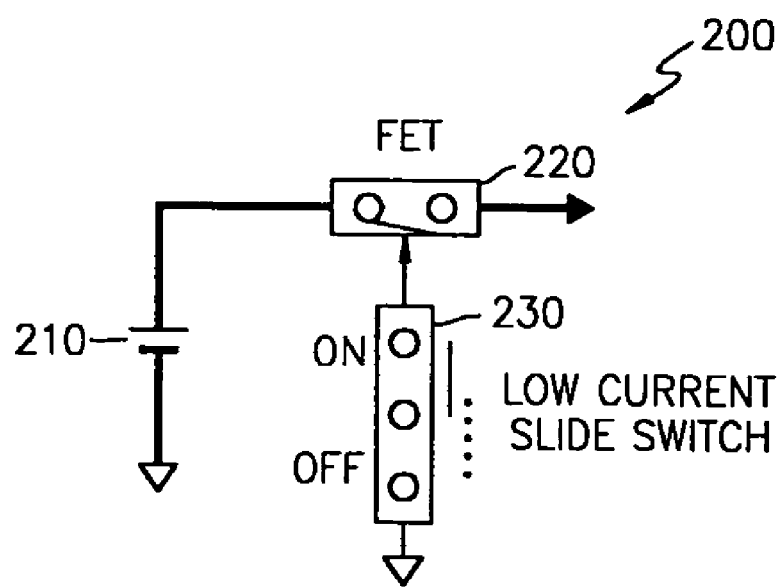
FIG. 2 is a schematic diagram of another related art battery controller.
Figure 3:
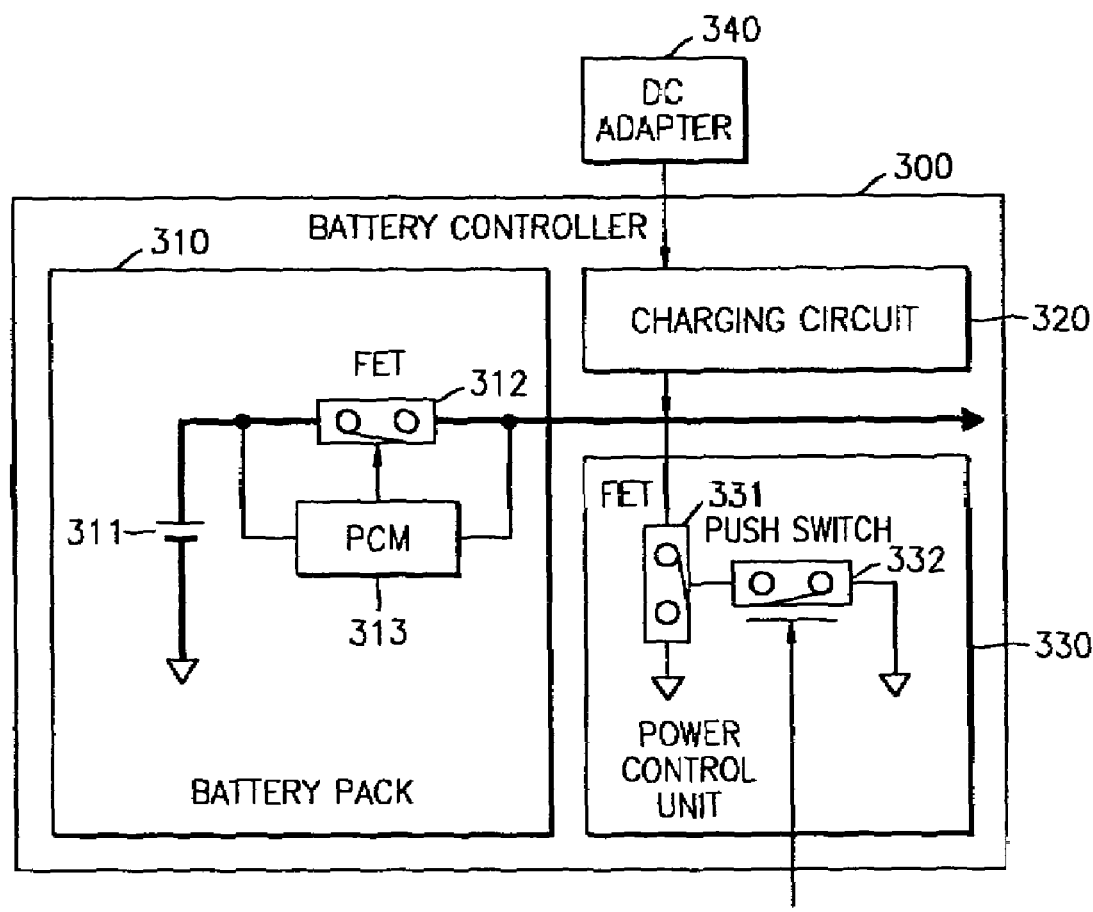
FIG. 3 shows a structure of a battery controller according to an exemplary embodiment of the present invention.

FIG. 3 shows a structure of a battery controller according to an exemplary embodiment of the present invention. Referring to FIG. 3, the battery controller 300 includes a battery pack 310, a battery charging circuit 320, and a power control unit 330.

The battery pack 310 includes a battery 311, an FET 312 for controlling on and off states of the battery, and a protection control module (PCM) 313 for controlling the FET 312. The PCM 313 is comprised of a printed circuit board (PCB) including an IC controller chip and an FET switch for controlling currents as basic elements together with passive elements such as a voltage detector, resistors, and capacitors. When an electrical abnormality, such as over-charge, over-discharge, electrical short, etc., occurs, the PCM 313 prevents deterioration of electrical performance of the battery and suppresses physical/chemical abnormalities of the battery.

In a non-limiting embodiment, the battery pack 310 may include rechargeable batteries selected from Lithium ion, Lithium ion polymer, or NiMH group batteries. The battery charging circuit 320 typically outputs static voltages or currents until completion of charging the battery. The power control unit 330 includes an FET 331 and a low power push switch 332. The FET 331 is turned on or off according to whether the push switch 332 is pushed or not.

An operation of the battery controller 300 for turning off the battery will now be described. When the push switch 332 is pushed before distribution, the FET 331 (power switch) is turned on and leakage currents flow since the drain and the source of the FET 331 are connected. When the leakage currents flow, the PCM 313 included in the battery pack 310 operates and the FET 312 included in the battery pack 310 is turned off so as not to output power. Accordingly, the battery is kept in the off state by pushing the push switch 332 before the shipment.

In a charging operation, when a customer connects a DC adapter 340 to the battery charging circuit 320, charging currents are supplied to the battery pack 310 through the battery charging circuit 320. Then, the PCM 313 included in the battery pack 310 detects the input charging currents and turns on the FET 312 included in the battery pack 310.

In one embodiment, once the FET 312 is turned on, the battery is not turned off until the push switch 332 is pushed again.

Figure 4:
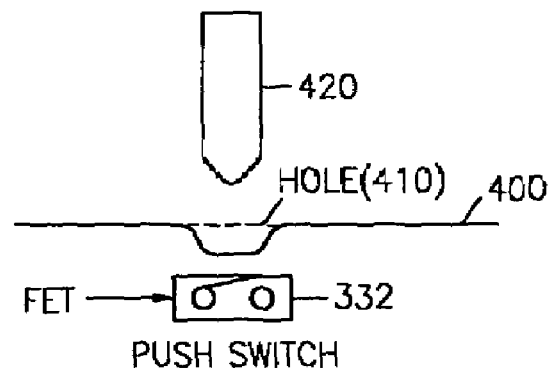
FIG. 4 a schematic diagram for explaining operations of a push switch included in the battery controller shown in FIG. 3.

FIG. 4 a schematic diagram for explaining operations of a push switch included in the battery controller shown in FIG. 3. The push switch 332 is placed within a set 400 and a hole 410 is provided in the outer case of the set so that the push switch 332 can be pushed through the hole 410 using a separate tool 420.

As described above, according to the present invention, the outer appearance of a set is not damaged since there is provided only a small hole through which a push switch can be pushed. Further, the battery can be more reliably kept in an off state since operations for turning off the battery are carried out using a PCM. In addition, usability can be improved since the battery can be turned on when a user simply connects the adapter.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A battery controller, comprising:
   a push switch operable to be switched on and off;
   a power switch connected to the push switch and operable to allow a leakage current to flow through the power switch based on input from the push switch;
   a battery pack including a battery and a protection circuit module (PCM) for turning off the battery when the leakage current flows through the power switch; and
   a charging circuit for charging the battery pack.

2. The battery controller of claim 1, wherein the PCM is operable to turn the battery on when the PCM detects that charging currents are being applied to the battery pack.

3. The battery controller of claim 2, wherein the battery pack is operable to receive the charging currents from a DC adapter connected to the battery pack when the battery is in an off state.

4. The battery controller of claim 1, wherein the battery of the battery pack includes a rechargeable battery comprising at least one of Lithium-ion, Lithium-ion polymer, and NiMH batteries.

5. The battery controller of claim 1, wherein the battery controller is disposed in a personal telecommunication device, and the push switch is operated via an opening in an outer surface of the personal telecommunication device.

6. The battery controller of claim 1, wherein the battery is turned off when the PCM of the battery pack detects the leakage current and accordingly an FET within the battery pack is turned off.

7. A battery controller, comprising: a push switch operable to be switched on and off, a power switch, connected to the push switch, and operable to allow a leakage current to flow to a battery pack based on input from the push switch; the battery pack including a battery, means for detecting the leakage current, and means for turning off the battery when the leakage current is detected; and means for charging the battery pack.

8. The battery controller of claim 7, wherein the battery controller is disposed in a personal telecommunication device, and the switch is operated via an opening in an outer surface of the personal telecommunication device.

9. The battery controller of claim 7, further including means for detecting charging currents applied to the battery pack from the means for charging the battery pack; and
   means for turning on the battery on when the means for detecting charging currents detects that charging currents are being applied to the battery pack.

10. The battery controller of claim 7, wherein the means for charging the battery pack are connected with a DC adapter.

* * * * *